INVENTOR.
THERON T. COLLINS, JR.

United States Patent Office 2,993,753
Patented July 25, 1961

2,993,753
SODIUM SULPHITE LIQUOR RECOVERY
Theron T. Collins, Jr., 508 N. 5th St., Palatka, Fla.
Filed Jan. 8, 1957, Ser. No. 633,144
6 Claims. (Cl. 23—48)

This invention pertains to the recovery of spent sodium base liquors of the sulphite type in connection with the manufacture of cellulose by digestion with such liquors.

An object of the invention is to minimize loss of sulphur and sodium in the recovery of spent liquors of the sodium base sulphite type.

Another object of the invention is to reduce the amount and size of equipment necessary to regenerate liquors of the sodium base sulphite type.

A further object is to reduce corrosion in multiple effect evaporators in recovery systems for sodium base sulphite type liquors, and to minimize loss of sulphur in connection with multiple effect or other indirect or thermocompression evaporation of spent sulphite type liquors.

A general object of the invention is to minimize stream and air pollution in a sodium base sulphite type liquor recovery system.

A specific object of the invention is to minimize production of sodium thiosulphate in recovery systems for sodium base sulphite type liquors.

A still further object is to provide a recovery system adapted to regenerate alkaline, acid or neutral liquors without substantial modification or change, whereby no close control of pH of the spent liquor entering the recovery system, from the washers, is required.

An additional specific object is to improve the carbonating and stripping of green liquor in a sodium base sulphite type liquor recovery system.

Another specific object is to minimize the amount of inert gases, such as nitrogen, which are passed to the recovery furnace in a sodium base sulphite type liquor recovery system.

The term "sulphite type liquor" used herein is intended to include sulphite liquors, bisulphite liquors and liquors comprising mixtures of sulphite and bisulphite. The term "sodium base" as applied to the compounds herein means that the compound is a sodium salt, such as sodium sulphite or sodium bicarbonate or the like, as the case may be.

Figure 1:
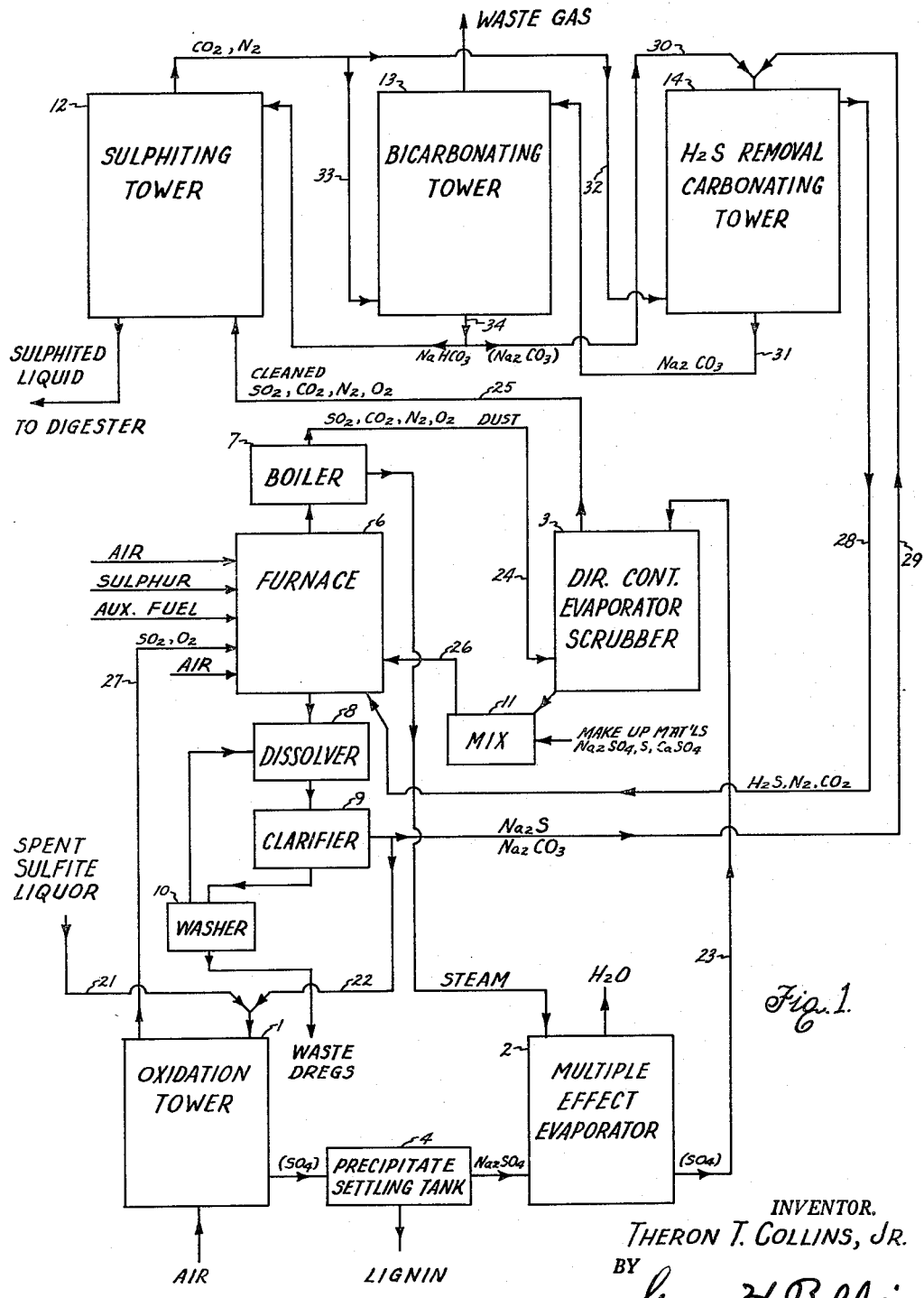
Figure 2:
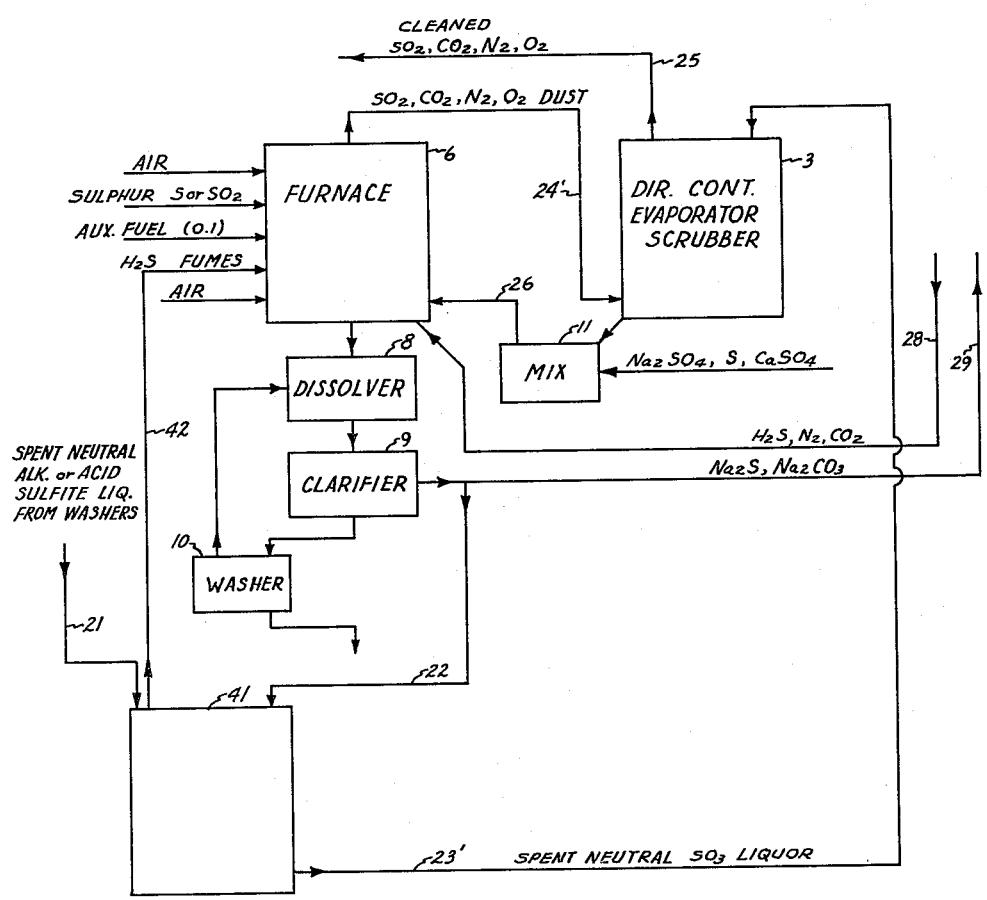

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a schematic diagram of a recovery system in accord with the invention; and FIG. 2 is a schematic diagram of a portion of a recovery system in accord with a modification of the invention.

For many years it has been know that cellulose manufactured by digestion of wood with sodium sulphite or sodium bisulphite is of superior quality to that obtainable by digestion with calcium bisulphite. However, lacking a complete sodium-sulphur recovery system for the used liquors from these processes, the high cost of suitable sodium alkalies has prevented this process from being competitive with the calcium bisulphite method. In some instances it has been economically feasible to use the soda base sulphite or bisulphite process where the waste liquors are used as make-up for the kraft or sulphate recovery system. This, however, has limited the size of the sulphite operation to a fraction of that of the sulphate operation since the amount of make-up the sulphate system can handle is not very great. In well run mills the sulphite to kraft ratio does not normally exceed about 25 percent, where the sulphite liquor is make-up for the kraft.

In order to make the sulphite mill completely independent of a kraft operation and to secure the advantages of the soda base sulphite on an economical basis, it has become necessary to develop a cyclic recovery system to correspond to that which works so well for kraft liquors. Many of the steps of the kraft process can be applied to the sulphite recovery process but certain important modifications have been found necessary and these constitute the basis for the present invention.

The present invention relates to an economical and technically and practically operable soda base sulphite recovery process that is suitable for the recovery of spent alkaline or neutral sulphite or acid bisulphite liquors in a form suitable for re-use in pulping cellulose-containing materials. This system is unique in that it provides for maximum recovery of the sodium-sulphur salts, the gaseous sulphur dioxide and hydrogen sulphide, and the heat values of the organic material dissolved from the wood by the liquors. With this process it is economical to use sodium base sulphite type pulping liquors with all attendant advantages and in addition the pollution of air and stream is reduced to an allowable minimum.

The spent sulphite type liquor from the washing of the pulp is preferably collected at the maximum concentration consistent with the washing equipment available. Normally this will fall in the range of 10–20 percent total solids concentration in the liquor and it is, accordingly, desirable to use a counter-current washing system, such as is used in the kraft process, to secure the maximum recovery of liquor solids with the minimum dilution.

The process to which this invention is directed comprises, generally, the preparation of the spent sodium base sulphite type liquor for burning in a recovery furnace, the removal of sulphur dioxide from the stack gases by sulphiting, or bisulphiting, the carbonating of the green liquor produced by dissolving the furnace smelt, to provide hydrogen sulphide for return to the furnace, and to provide a sodium base carbonate type solution, such as a solution of sodium carbonate or a solution of a mixture of sodium carbonate and sodium bicarbonate, such solution being useful either directly or after further treatment in connection with the sulphiting of the flue gases.

The system shown in FIG. 1 according to the preferred embodiment comprises an oxidation tower 1 from which oxidized liquor passes to a multiple effect evaporator 2 and thence to a direct contact evaporator-scrubber 3, a settling tank 4 being interposed between the oxidation tower and the multiple effect evaporator to permit precipitation of lignin materials and of other precipitable solids. Such materials may be sold or burned in furnace 6. Evaporator-scrubber 3 supplies the waste liquor in suitably concentrated form, through a mixing tank 11, to furnace 6. Boiler 7 may comprise tubes in the furnace, or a separate unit heated by the furnace flue gases, to produce steam for evaporator 2 and, if desired, for other purposes. Green liquor is prepared by dissolving in tank 8 the furnace smelt produced in the lower reducing zone of the furnace. The dissolved smelt is passed to a green liquor clarifier 9, from which the dregs are washed in washer 10. Calcium carbonate and the like dregs go to waste. Green liquor from clarifier 9 comprising principally $Na_2S$ and $Na_2CO_3$ is fed as a water solution to carbonating tower 14 wherein reaction with a solution rich in sodium bicarbonate, and scrubbing with sulphurfree, carbon-dioxide-rich gas, provides a gaseous mixture including hydrogen sulphide for return to the furnace and further provides a solution rich in $Na_2CO_3$, although it may also comprise $NaHCO_3$.

Furnace flue gas from the boiler 7 passes through evaporator-scrubber 3, causing concentration of the waste liquor therein, the gas being cleaned or scrubbed by contact with the liquor, whence the gas passes into a sulphiting tower 12. Reaction between the sulphur dioxide in the gas and sodium carbonate, sodium bicarbonate or mixtures thereof, occurs in tower 12 to supply fresh sodium base sulphite type cooking or digestion liquor and further to remove substantially all sulphur from the gases. From tower 12, the sulphur-free gases are preferably divided into a bicarbonating tower 13 and into the carbonating tower 14. A solution rich in sodium carbonate enters tower 13 for conversion therein to sodium bicarbonate, the unreacted remainder of the sulphur-free flue gas exhausting from tower 13 to waste.

The spent liquor entering the oxidation tower, through line 21 from the washers, may comprise between about 10% to 20% solids by weight and it may, according to this invention, consist of spent sodium bisulphite or sulphite liquor. The liquor may be alkaline, neutral or acidic, and, if acidic, it is preferable to add through pipe 22 a proportion of green liquor from clarifier 9 sufficient to make the liquor entering the oxidaiton tower 1 neutral or slightly alkaline to reduce corrosion of carbon steel tubes of the multiple effect evaporator and to reduce precipitation of organic materials on the evaporator tube surfaces.

The liquor in oxidation tower 1 is contacted by air, converting the sulphite type compounds to sulphate compounds and driving off sulphur dioxide, together with acid fumes if acids are present, the mixture of air, sulphur dioxide and fumes being directed into furnace 6, thereby mixing the sulphur dioxide into the furnace flue gas before this gas has passed through the sulphiting tower 12. The addition of the $SO_2$ from the oxidation tower to the flue gases before the gases have passed through the sulphiting tower results in substantially complete recovery of sulphur and reduction of sulphur pollution of air or stream waste.

The oxidized spent liquor leaving tower 1 is passed into settling tank 4 in which lignin solids that have been precipitated from the liquor during the oxidation step may be withdrawn for sale or for burning in the furnace, and the liquor from which the settleable solids have been precipitated is then passed into multiple effect evaporator 2. While a multiple effect evaporator is preferred, other types of indirect contact or thermocompression evaporators may be employed at 2 if desired with advantages in accord with this invention. It has been found that the oxidized liquor when evaporated in an indirect contact evaporator does not release any appreciable amount of sulphur dioxide, thereby reducing air and stream pollution, reducing corrosion of the tubes of the evaporator on the vapor side and, of course, substantially reducing the sulphur loss from the system. Steam is supplied to evaporator 2 from a boiler 7 or furnace 6, or from some other suitable source. It will be understood that multiple effect evaporators are preferred in relatively large installations wherein the additional economy of indirect evaporation makes the additional steam generating and evaporation equipment appropriate. In large installations, it is usual, also, that steam will be required for various purposes about the mill and that it will be also available for use in such evaporators. Certain advantages of my invention accrue, however, even though the spent liquor may be fed directly to a direct contact evaporator, from which evaporator the sulphur-dioxide-containing gases are mixed with flue gases from the furnace for supplying to a sulphiting tower, as shown, for example, in FIG. 2.

The liquor as withdrawn from the evaporator 2, in line 23, may have been concentrated in evaporator 2 to a solids content of between about 20% and about 50%, and unless the multiple effect evaporator at least substantially doubles the percentage of solids in the liquor, the provision of such an evaporator may prove uneconomic. The liquor from the evaporator is fed to a direct contact evaporator-scrubber 3, a particularly suitable unit being a venturi-scrubber, and flue gases are introduced into the scrubber through line 24. Dust particles in the flue gases are taken up in the liquor flowing through the scrubber, and water vapor is extracted by the gases and passes with the gases out of the scrubber through line 25. The liquor which is now concentrated sufficiently to permit burning thereof in furnace 6, such as to between about 55 and 70% solids, passes into mixing tank 11, wherein make-up chemicals such as sodium sulphate, sulphur and calcium sulphate may be mixed with the liquor prior to its introduction into furnace 6 through line 26. If desired, sulphur either in the form of the molten liquid or powdered element, or as sulphur dioxide from an auxiliary burner, may be introduced into the furnace, as may be auxiliary fuel, such as oil. If oil is so introduced, its burning furnishes $CO_2$ and $SO_2$ make-up chemicals. Air is introduced as indicated in FIG. 1, not only in the lower portions of the furnace, which constitute a reducing zone, but also in the upper portion, it being important that sufficient air be available for the burning of all of the gaseous sulphur compounds which are to pass off in the flue gases into sulphur dioxide. The mixture of sulphur dioxide and air from oxidation tower 1 which may be introduced into the furnace through line 27 is effective to add a certain portion of the necessary oxygen to the furnace. Hydrogen sulphide from line 28 is also supplied for burning to the furnace.

Flue gases from the furnace comprise principally sulphur dioxide, carbon dioxide, nitrogen and small percentages of oxygen and inert gases. The furnace is preferably used to produce steam in a boiler, as indicated, if multiple effect evaporators are used, although in small installations the boiler may be omitted.

The furnace smelt is removed and dissolved in a tank 8 to provide a solution which passes then into green liquor clarifier 9, from which the green liquor principally $Na_2S$ and $Na_2O_3$ is directed into a line 29 leading to carbonating tower 14, a small portion being drawn off through line 22 for neutralizing acid liquors if desired. Dregs from clarifier 9 are washed in a tank 10 and the washed dregs, such as calcium carbonate, iron sulphide, carbon, and the like, are disposed of, while the wash water is re-circulated into dissolving tank 8.

The clarified green liquor fed to carbonating tower 14 is mixed before passing through the tower with a solution rich in sodium bicarbonate furnished through line 30 from bicarbonating tower 13. The mixing of green liquor, sodium sulphide and sodium carbonate, with the sodium bicarbonate causes a reaction resulting in the formation of hydrogen sulphide and converting at least some of the sodium bicarbonate into sodium carbonate, whereby a solution relatively rich in sodium carbonate and relatively weak in sodium bicarbonate is produced and removed through line 31 at the bottom of the tower. The hydrogen sulphide is stripped from the liquids in tower 14, in accord with this invention, by sulphur-free gases rich in carbon dioxide and comprising principally carbon dioxide and nitrogen. Only sufficient gas is supplied through line 32 to accomplish the thorough stripping of hydrogen sulphide and the stripping gases pass with the hydrogen sulphide through line 28 for introduction into the furnace. It has been found that the presence of carbon dioxide gas in tower 14 assists the action of the sodium bicarbonate and that it provides, with the nitrogen, a highly efficient stripping action.

Sodium carbonate solution removed from tower 14 through line 31 is introduced adjacent the upper end of bicarbonating tower 13 and is therein treated by the sulphur-free flue gases coming from sulphiting tower 12 through line 33. A substantially greater proportion of the gases from the sulphiting tower pass through line 33 into bicarbonating tower 13 than through line 32 into carbonating tower 14. The gases entering tower 13, after contact with the carbonate solution and after removal of some $CO_2$ therefrom to bicarbonate the sodium carbonate solution, and which thus comprise principally sulphur-free nitrogen and carbon dioxide, are exhausted to waste.

Sulphiting tower 12 receives the cleaned and scrubbed flue gases from line 25 and it also receives a sodium base carbonate type solution, which is, preferably, as shown, a part of the sodium-bicarbonate-rich solution furnished from bicarbonating tower 13 through line 34. The carbonate type sodium base solution contacted by the flue gases reacts therewith to remove substantially all sulphur therefrom and thereby to form sulphited liquor for supply to the digesters. The liquor may be substantially entirely sodium sulphite liquor, or it may be substantially entirely sodium bisulphite liquor, or it may contain mixtures of these sodium base sulphite type compounds depending on the amount of sulphitation of the sodium alkali in tower 12.

The system shown in FIG. 2 differs from the system of FIG. 1 with respect to the preliminary treatment of the liquor prior to its introduction into the furnace but supplies a green liquor solution through line 29 for carbonation in accord with the system of FIG. 1, receives a mixture of gases including stripped hydrogen sulphide from the carbonating tower and supplies cleaned flue gases through line 25 to the sulphiting tower, all as heretofore explained in connection with FIG. 1.

The liquor from the washers, in accord with FIG. 2, enters a tank 41, to which, if the spent liquor is not sufficiently alkaline, a portion of the green liquor is added sufficient to make the liquor passing from tank 41 through line 23′ neutral or sufficiently alkaline. The contacting of the spent acid liquor in tank 41 may release $H_2S$ and fumes which are supplied through line 42 to furnace 6. Since FIG. 2 includes no multiple effect evaporator, it may be considered as a system particularly adapted to relatively small mills, and, accordingly, the furnace 6 is shown as comprising no boiler or other steam production facilities, and the flue gas from the furnace is led directly to a direct contact evaporator-scrubber 3 through line 24′. If steam is desired for any purpose, it may be found appropriate to provide a boiler or boiler tubes in connection with furnace 6. If steam is not to be generated, it may be appropriate to operate furnace 6 without auxiliary fuel in the form of oil, depending upon various factors as, for example, the concentration of the liquor and combustible chemicals introduced into the furnace through line 26.

Portions of the system of FIG. 2 are indicated with numerals corresponding to those employed in connection with FIG. 1 insofar as the various elements so identified are substantially identical or correspond closely in function, and the description above in connection with FIG. 1 is equally applicable to the similarly identified portions of the system of FIG. 2, it being understood that the carbonating tower, bicarbonating tower and sulphiting tower of FIG. 1 constitute a part of the complete system according to the modification of FIG. 2.

By circulating $Na_2CO_3$ through tower 13 and creating $NaHCO_3$ in this tower separate from tower 14, and by using $NaHCO_3$ in tower 14, the amount of stripping gas required in tower 14 is minimized and this result is also aided by recycling a portion of the $NaHCO_3$ from tower 13 to tower 12 whereby the gas from tower 12 is enriched with carbon dioxide. Thus a minimum of inert nitrogen is introduced into tower 14. A minimum of carbon dioxide, nitrogen and of all gases other than $H_2S$ is, thus, passed back to furnace 6.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. The process for regenerating spent liquor from a sodium base sulphite type wood pulping process comprising the steps of concentrating the spent liquor by multiple effect evaporation to at least substantially double the percentage total solids concentration thereof, further concentrating the spent liquor from said multiple effect concentrating step to a total solids content between substantially 55% and 70% and thereafter burning the further concentrated liquor in a furnace to obtain carbon dioxide and sulfur dioxide containing flue gases and to obtain a furnace smelt which includes sodium carbonate and sodium sulfide, removing said smelt from said furnace and leaching said smelt with water to form green liquor, mixing said green liquor with an aqueous solution of sodium bicarbonate to form a hydrogen sulfide containing aqueous solution of sodium carbonate, stripping the hydrogen sulfide from said aqueous solution of sodium carbonate in a tower by contacting carbon dioxide containing gases derived from said flue gases therewith and thereafter passing the stripped hydrogen sulfide to said furnace, contacting the stripped aqueous solution of sodium carbonate with carbon dioxide containing gases in another tower to form an aqueous solution of sodium bicarbonate, recycling a portion of said aqueous solution for such mixing with said green liquor, thereafter sulphiting another portion of the sodium bicarbonate solution formed in said other tower by contacting said portion of the aqueous sodium bicarbonate solution with said flue gases in a sulfiting tower to produce fresh sodium base sulfite type liquor and to enrich the carbon dioxide content of said flue gases and produce sulphur free flue gases which include carbon dioxide, and passing a portion of said sulphur free flue gases to said other tower for such contacting to form said aqueous solution of sodium bicarbonate from said aqueous solution of sodium carbonate.

2. A recovery process for spent sodium base sulphite type liquor comprising the steps of contacting said liquor with air to produce a gaseous mixture of principally $SO_2$, $N_2$, and $O_2$ and to produce a precipitate containing oxidized liquor comprising principally sulphate materials and lignin, removing said precipitate from said oxidized liquor, concentrating by multiple effect evaporation said oxidized liquor from which said precipitate has been removed, contacting the oxidized liquor following said concentrating thereof with flue gases from a furnace to further concentrate said liquor and to scrub said flue gases and thereby remove dust from said flue gases, burning the further concentrated liquor in said furnace to produce a smelt and to produce gases comprising principally $SO_2$, $CO_2$, $N_2$, and $O_2$, leaching said smelt with water to produce green liquor, mixing an aqueous solution of predominantly sodium bicarbonate with said green liquor to produce a $H_2S$ containing aqueous solution of sodium carbonate, stripping the $H_2S$ from said aqueous solution of sodium carbonate by contacting said $H_2S$ containing aqueous solution of sodium carbonate with gases containing predominantly $CO_2$ and $N_2$ in a tower, passing said gaseous mixture into said furnace whereby the $SO_2$ and $N_2$ in said gaseous mixture combine with the gases produced in said burning step, contacting such scrubbed flue gases with an aqueous solution comprising predominantly sodium bicarbonate in a sulphiting tower to sulphite said sodium bicarbonate solution and to produce a gaseous effluent from said sulfiting tower which is substantially free of sulfur dioxide and comprises predominantly $CO_2$ and $N_2$, contacting the stripped aqueous solution of sodium carbonate in another tower with a portion of said gaseous effluent to produce said aqueous solutions of predominantly sodium bicarbonate, passing another portion of said gaseous effluent to the first mentioned tower for such stripping of said $H_2S$ from said aqueous solution of sodium carbonate, and feeding the gases resulting from said stripping step to said furnace.

3. The method according to claim 1 further comprising contacting the spent liquor with air in an oxidation tower prior to said concentrating step to oxidize said spent liquor and to evolve sulphur dioxide gas therefrom, and passing the evolved sulfur dioxide gas from said oxidation tower to said furnace.

4. The process for regenerating spent sodium base sulfite liquor from a sodium base sulfite type wood pulping process comprising separately concentrating and thereafter burning said spent liquor in a furnace to produce flue gases and a smelt, leaching said smelt with water to form green liquor, carbonating said green liquor by admixing an aqueous sodium bicarbonate solution therewith to form an aqueous solution of sodium carbonate which contains dissolved $H_2S$, stripping said dissolved $H_2S$ from said sodium carbonate solution in a stripping tower by passing sulphur-free gases derived from said furnace through said sodium carbonate solution, passing the stripped $H_2S$ to said furnace to therein be burned with said spent liquor, carbonating the stripped sodium carbonate solution in a bicarbonating tower to form an aqueous solution of predominantly sodium bicarbonate by passing sulfur-free gases derived from said furnace through said stripped sodium carbonate solution, recycling a portion of the formed aqueous sodium bicarbonate solution for said admixing with said green liquor, and sulfiting another portion of said formed aqueous sodium bicarbonate solution in a sulfiting tower to produce sodium sulfite digesting liquor and said sulfur-free gases by passing flue gases from said furnace through said other portion of said aqueous sodium bicarbonate solution.

5. The process according to claim 4 further comprising oxidizing said spent liquor prior to said concentrating step by passing air through said spent liquor in an oxidation tower, and passing the effluent gases from said oxidation tower to said furnace.

6. The process for regenerating spent sodium base sulfite liquor from a sodium base sulfite type wood pulping process comprising contacting an aqueous solution of sodium bicarbonate with furnace effluent gases comprising predominantly $SO_2$, $N_2$ and $CO_2$ in a sulfiting tower to produce sodium sulfite cooking liquor and to remove said $SO_2$ from and enrich the $CO_2$ content of said effluent gases, thereby producing substantially sulfur-free gases comprising predominantly $N_2$ and $CO_2$, admixing another aqueous solution of sodium bicarbonate with green liquor comprising an aqueous solution of predominantly sodium carbonate and sodium sulfide to produce a hydrogen sulfide containing aqueous solution of predominantly sodium carbonate, contacting said hydrogen sulfide containing aqueous solution of predominantly sodium carbonate with a portion of said sulfur-free gases in a tower to strip the hydrogen sulfide from said hydrogen sulfide containing aqueous solution of predominantly sodium carbonate and to produce a hydrogen sulfide free aqueous sodium carbonate solution and hydrogen sulfide containing gases, contacting said hydrogen sulfide free aqueous sodium carbonate solution with another portion of said sulfur-free gases in a bicarbonating tower to produce said aqueous solutions of sodium bicarbonate, concentrating spent sodium base sulfite liquor by evaporation to produce concentrated liquor, burning said concentrated liquor and said hydrogen sulfide containing gases with air in a furnace to produce said furnace effluent gases and to produce a smelt comprising predominantly sodium carbonate and sodium sulfide, and leaching said smelt with water to produce said green liquor.

References Cited in the file of this patent

UNITED STATES PATENTS

| 1,983,789 | Bradley et al. | Dec. 11, 1934 |
| 2,593,503 | Tomlinson et al. | Apr. 22, 1952 |
| 2,789,883 | Cook | Apr. 23, 1957 |

FOREIGN PATENTS

| 151,899 | Australia | June 16, 1953 |
| 481,587 | Canada | Mar. 11, 1952 |